United States Patent
Alieiev et al.

(10) Patent No.: US 10,693,831 B2
(45) Date of Patent: Jun. 23, 2020

(54) METHOD, APPARATUS, AND COMPUTER READABLE STORAGE MEDIUM COMPRISING INSTRUCTIONS FOR VEHICLE-TO-VEHICLE COMMUNICATION

(71) Applicant: VOLKSWAGEN AG, Wolfsburg (DE)

(72) Inventors: Roman Alieiev, Stendal (DE);
Thorsten Hehn, Wolfsburg (DE);
Andreas H. Kwoczek, Lehre (DE);
Klaus Schaaf, Braunschweig (DE)

(73) Assignee: Volkswagen AG (DE)

( * ) Notice: Subject to any disclaimer, the term of this patent is extended or adjusted under 35 U.S.C. 154(b) by 208 days.

(21) Appl. No.: 15/842,957

(22) Filed: Dec. 15, 2017

(65) Prior Publication Data

US 2018/0191665 A1 Jul. 5, 2018

(30) Foreign Application Priority Data

Jan. 5, 2017 (DE) .................. 10 2017 200 099

(51) Int. Cl.
*H04L 12/58* (2006.01)
*H04L 29/06* (2006.01)
(Continued)

(52) U.S. Cl.
CPC ............ *H04L 51/38* (2013.01); *H04L 9/3236* (2013.01); *H04L 63/10* (2013.01); *H04L 63/123* (2013.01);
(Continued)

(58) Field of Classification Search
CPC .......... H04L 51/38; H04L 63/10; H04L 67/12
See application file for complete search history.

(56) References Cited

U.S. PATENT DOCUMENTS

| 8,510,324 B2 | 8/2013 | Bai et al. |
| 9,705,679 B2 | 7/2017 | Misawa et al. |

(Continued)

FOREIGN PATENT DOCUMENTS

| CN | 102708113 A | 10/2012 |
| CN | 103281191 A | 9/2013 |

(Continued)

OTHER PUBLICATIONS

Forte et al.; Beyond Bitcoin—Part I: A critical look at blockchain-based systems; International Association for Cryptologic Research; Dec. 1, 2015; vol. 20151202:213043; pp. 1-34.

(Continued)

*Primary Examiner* — Chris Parry
*Assistant Examiner* — Steven C Nguyen
(74) *Attorney, Agent, or Firm* — Barnes & Thornburg LLP

(57) ABSTRACT

A method, an apparatus, and a computer-readable storage medium having instructions for Vehicle-to-Vehicle communication. Messages are exchanged between a first vehicle and a second vehicle. Each of the messages includes a hash pointer to the respective last previous message. After completion of the exchange of messages, a hash pointer to the last message of the exchange of messages is signed individually by each participant and published. In case the resulting negotiated contract has to be changed, a further message is added to the exchange of messages, which includes a hash pointer to the last message of the exchange of messages. Finally a hash pointer to the further message is published.

20 Claims, 3 Drawing Sheets

(51) Int. Cl.
*H04L 29/08* (2006.01)
*H04L 9/32* (2006.01)

(52) U.S. Cl.
CPC ............ *H04L 63/126* (2013.01); *H04L 67/12* (2013.01); *H04L 2209/38* (2013.01); *H04L 2209/84* (2013.01)

(56) References Cited

U.S. PATENT DOCUMENTS

| | | | |
|---|---|---|---|
| 10,158,480 B1* | 12/2018 | Winklevoss | H04L 9/3239 |
| 2011/0066859 A1 | 3/2011 | Iyer et al. | |
| 2011/0238997 A1 | 9/2011 | Bellur et al. | |
| 2016/0261690 A1 | 9/2016 | Ford | |
| 2018/0027600 A1* | 1/2018 | Lawlis | H04L 9/0869 |
| | | | 713/168 |
| 2018/0089256 A1* | 3/2018 | Wright, Sr. | G06F 16/2379 |
| 2018/0091596 A1* | 3/2018 | Alvarez | H04L 67/12 |
| 2018/0165476 A1* | 6/2018 | Carey | G06F 21/64 |

FOREIGN PATENT DOCUMENTS

| | | |
|---|---|---|
| CN | 104853351 A | 8/2015 |
| CN | 105308899 A | 2/2016 |

OTHER PUBLICATIONS

Office Action for European Patent Application No. 17203008.2; dated May 30, 2018.
Narayanan et al.; Bitcoin and Cryptocurrency Technologies; Bitcoin and Cryptocurrency Technologies; Feb. 9, 2016; pp. 1-308.
Office Action for European Patent Application No. 17203008.2; dated Apr. 21, 2020.
Office Action for Chinese Patent Application No. 201810011544.6; dated Apr. 3, 2020.

* cited by examiner

METHOD, APPARATUS, AND COMPUTER READABLE STORAGE MEDIUM COMPRISING INSTRUCTIONS FOR VEHICLE-TO-VEHICLE COMMUNICATION

PRIORITY CLAIM

This patent application claims priority to German Patent Application No. 10 2017 200 099.6, filed 5 Jan. 2017, the disclosure of which is incorporated herein by reference in its entirety.

SUMMARY

Illustrative embodiments relate to a method, an apparatus, and a computer-readable storage medium comprising instructions for Vehicle-to-Vehicle communication. Illustrative embodiments further relate to a vehicle using such a method or apparatus.

BRIEF DESCRIPTION OF THE DRAWINGS

Exemplary embodiments will become apparent from the following description and the appended claims in conjunction with the figures.

DETAILED DESCRIPTION

Figure 1:
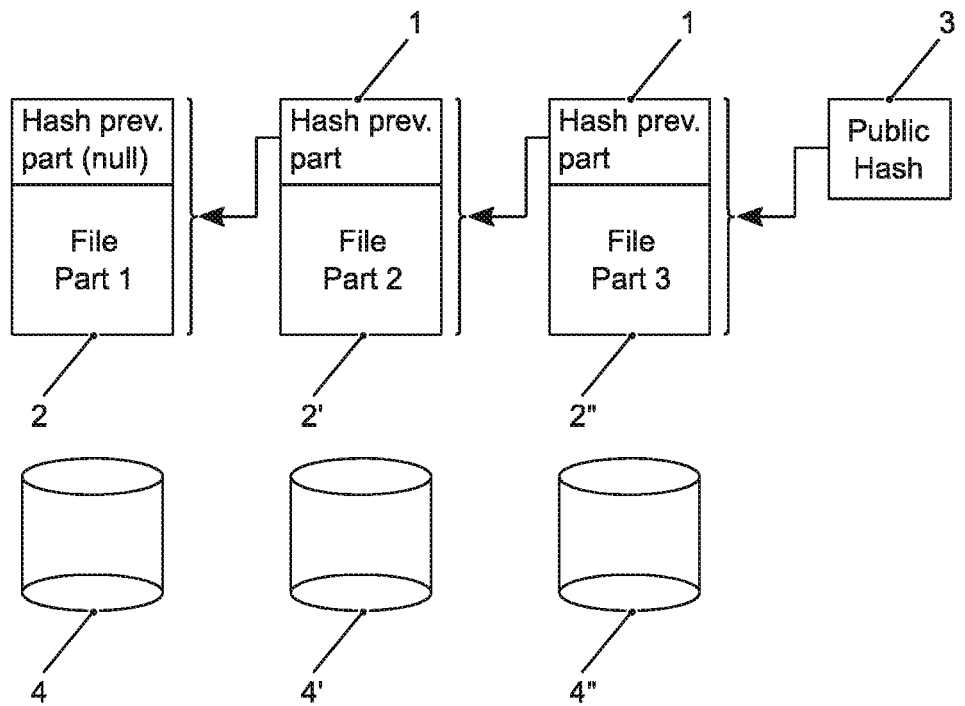
FIG. 1 schematically illustrates the concept of a public ledger.

In Vehicle-to-Vehicle communication messages are exchanged between vehicles to enable novel safety-relevant use cases. Most of the currently known use cases provide warnings to alert a driver about an imminent event, such as two vehicles colliding with each other. To this end, Vehicle-to-Vehicle communication is based on single messages, which are signed by the sending vehicle. The signature provides integrity and non-repudiation. A natural extension to safety warnings are cooperative manoeuvres, which allow increasing both safety and efficiency of road usage.

Cooperative manoeuvres can be performed in a variety ways. One efficient way is for two vehicles to negotiate a contract. Once this contract is complete, the manoeuvres of the negotiated contract are carried out. In case a need for a change of plans arises, this change needs to be agreed upon as well.

It may occur that one of the participants deviates from the manoeuvres of the negotiated contract and attempts to afterwards change the negotiation. There thus is a need to be able to prove a complete negotiation and to identify a party that has a performed such an attempt.

Disclosed embodiments provide a solution for Vehicle-to-Vehicle communication, which enables a participant of an exchange of messages to prove a complete negotiation.

This is achieved by a method, by an apparatus, and by a computer-readable storage medium comprising instructions.

According to at least one disclosed embodiment, a method for Vehicle-to-Vehicle communication implemented in a first vehicle comprises:
  Exchanging messages between the first vehicle and a second vehicle, each of the messages comprising a hash pointer to the respective last previous message; and
  After completion of the exchange of messages, publishing a hash pointer to the last message of the exchange of messages.

Accordingly, an apparatus for Vehicle-to-Vehicle communication comprises:
  A communication unit configured to exchange messages between a first vehicle and a second vehicle, each of the messages comprising a hash pointer to the respective last previous message; and
  A publication unit configured to publish a hash pointer to the last message of the exchange of messages after completion of the exchange of messages.

Similarly, a computer-readable storage medium has stored therein instructions, which, when executed by a computer, cause the computer to:
  Exchanging messages between a first vehicle and a second vehicle, each of the messages comprising a hash pointer to the respective last previous message; and
  After completion of the exchange of messages, publishing a hash pointer to the last message of the exchange of messages.

The present solution makes use of a public or distributed ledger, as used in the field of blockchain technology. The concept of the public or distributed ledger is simple and yet very efficient. Its basic idea is to store data in a distributed manner and on non-trustworthy storage, while being able to detect whether any part of the message has been corrupted. To this end the concept uses hash pointers. A hash pointer to a data element is an object which keeps a link to the data element (e.g., a URL—Uniform Resource Locator) and a hash of the data element. A hash function is a compression function that has been designed with collision resistance in mind. This means that the hash function will create a digest of the data element (compression part) with the property that it is very hard to forge a different file with the same hash (collision resistance). A prominent family of hash functions is the secure hashing algorithm (SHA) family.

Based on the public ledger, the disclosed embodiments provide a solution for distributed consent. Neither of the parties can change the consent afterwards, even if the party is the sole keeper of one of the messages of the negotiation. One will be able to detect whether the communication chain has been altered and which participant has altered the chain. The public or distributed ledger concept allows for all participants to prove a complete negotiation without having to store all involved messages. The supported number of parties is arbitrary.

According to at least one disclosed embodiment, a further message may be added to the exchange of messages. The further message comprises a hash pointer to the last message of the exchange of messages. Subsequently a hash pointer to the further message is published. In this way it is possible to modify the negotiated contract. The modification can be initiated by either party. The extension of the contract is again sealed by the publication of the hash pointer to the last message. As this chain of messages is longer than the previous one, it supersedes the previously agreed contract.

According to at least one disclosed embodiment, the messages are stored by the vehicle sending the message. In this way it is possible to prove the exact content of the messages. Any modification of this content is hampered by the existence of the hash pointer to the message.

According to at least one disclosed embodiment, the hash pointer of a message or the complete message are stored by the vehicle receiving the message. This gives the receiver of the message the possibility to prove any modification of the original message by the sender of the message.

According to at least one disclosed embodiment, each message is signed by the vehicle sending the message. Alternatively or in addition, each published hash pointer is signed by the vehicle publishing the hash pointer. Signing the messages or the hash pointers provides an additional layer of integrity and non-repudiation to the exchange of messages.

According to at least one disclosed embodiment, the hash pointer to the last message of the exchange of messages is published by both the first vehicle and the second vehicle. Optionally, also the hash pointer to the further message is published by both vehicles. In this way either participant of the exchange of messages does not need to rely on the respective other participant to publish these hash pointers. This makes it easier to prove the content of the negotiated contract, because if only one participant were responsible for publication of a hash pointer it might occur that this participant fails to actually publish the hash pointer.

According to at least one disclosed embodiment, a message has one of the types request, grant, change, and acknowledge. The present solution provides a general framework for negotiations. These four types of application layer messages are sufficient to describe any negotiation between vehicles.

A disclosed method or a disclosed apparatus are implemented in an autonomously driven or manually driven vehicle, for instance, in an autonomously driven or manually driven car.

For a better understanding, the principles of embodiments shall now be explained in more detail in the following description with reference to the figures. It is understood that the disclosure is not limited to these exemplary embodiments and that specified features can also expediently be combined or modified without departing from the scope of the present disclosure as defined in the appended claims.

FIG. 1 schematically illustrates a prior art concept of a public ledger. The public ledger utilizes a chain of hash pointers 1. Depicted in FIG. 1 is a public ledger for a file, separated into three parts 2, 2', 2". The owner of the public ledger will publish (or store) the last hash pointer 3 in the chain. As long as this hash pointer 3 is correct, the whole file can be checked for corruption. If there is no corruption, the file can be retrieved. This feature is called tamper-evident logging. Even if an attacker controls the three storage units 4, 4', 4" depicted in the example, the attacker will not be able to corrupt the file without evidence, as it is not possible for him to alter the public hash pointer 3.

Figure 2:
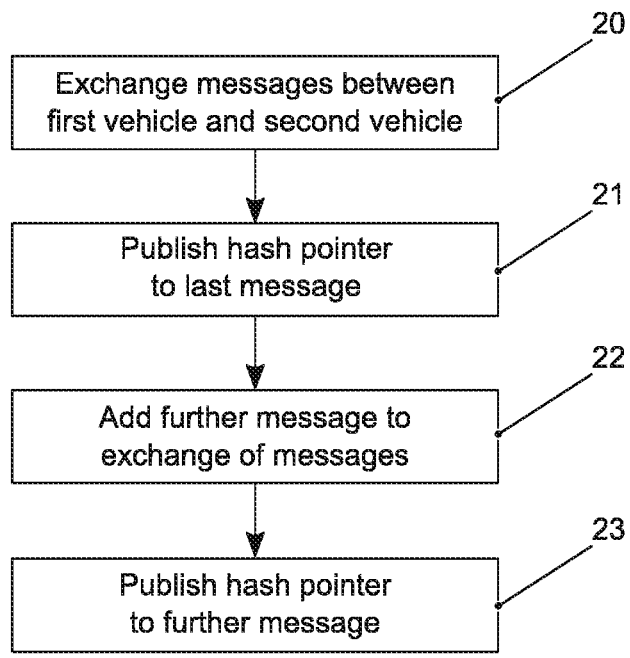
FIG. 2 schematically illustrates a flowchart of a method for Vehicle-to-Vehicle communication.

FIG. 2 depicts a simplified flow chart illustrating an example of a method for Vehicle-to-Vehicle communication implemented in a first vehicle. Messages are exchanged 20 between the first vehicle and a second vehicle. Each message comprises a hash pointer to the respective last previous message. For the first message this hash pointer in null. After completion of the exchange of messages, a hash pointer to the last message of the exchange of messages is published 21. In case the resulting negotiated contract needs to be changed, this can be initiated by either party. To this end a further message is added 22 to the exchange of messages, which comprises a hash pointer to the last message of the exchange of messages. Finally a hash pointer to the further message is published 23. Of course, more than one further message may be added, i.e., a further exchange of messages may be performed. In this case the ultimately published hash pointer points to the last message of this further exchange of messages.

Figure 3:
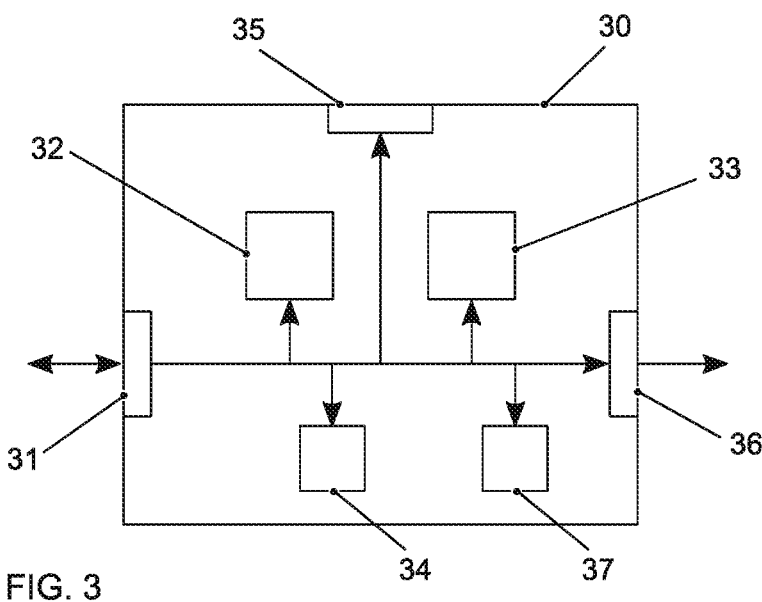
FIG. 3 depicts a first example of an apparatus for Vehicle-to-Vehicle communication.

FIG. 3 shows a simplified schematic illustration of a first example of an apparatus 30 for Vehicle-to-Vehicle communication, which can be integrated in a vehicle. The apparatus 30 has a communication unit 32 for exchanging messages with another vehicle via an interface 31. For this purpose the communication unit 32 may resort to a dedicated communication device of the vehicle. The apparatus 30 further has a publication unit 33 for publishing a hash pointer to a last message of the exchange of messages after completion of the exchange of messages. The communication unit 32 and the publication unit 33 may be controlled by a control unit 34. Via a user interface 35 parameters of the communication unit 32, the publication unit 33, and the control unit 34 may be changed. Data generated in the apparatus 30 are made available for further processing via an output 36. The output 36 may also be combined with the interface 31 into a single bidirectional interface. In addition, the data as well as the parameters of the various units 32, 33, 34 may be stored in a storage unit 37 of the apparatus, e.g., for a later evaluation. The communication unit 32, the publication unit 33, and the control unit 34 can be embodied as dedicated hardware, e.g., as integrated circuits. Of course, they may likewise be fully or partially combined into a single unit or implemented as software running on a suitable processor.

Figure 4:
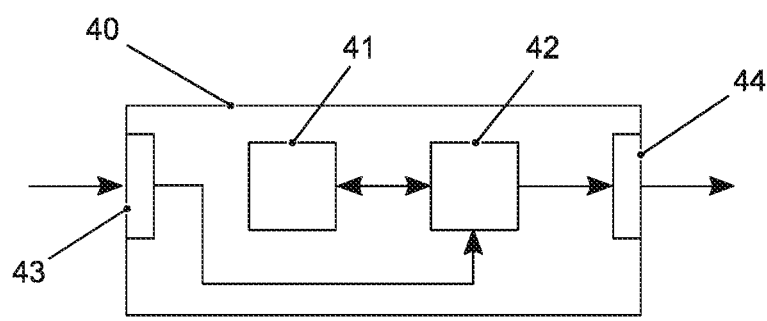
FIG. 4 depicts a second example of an apparatus for Vehicle-to-Vehicle communication.

FIG. 4 depicts a second example of an apparatus 40 for Vehicle-to-Vehicle communication. The apparatus 40 comprises a processing device 42 and a memory device 41. The apparatus 40 is, for example, a computer or an electronic control unit. The memory device 41 has stored therein instructions, which, when executed by the processing device 42, cause the apparatus 40 to perform operations according to one of the described methods. As such, the instructions stored in the memory device 41 tangibly embody a program of instructions executable by the processing device 42 to perform program operations as described herein according to the principles of the disclosed embodiments. The apparatus 40 has an input 43 for receiving information. Output parameters generated by the processing device 41 are made available via an output 44. In addition, they may be stored on the memory device 41. The output 44 may also be combined with the input 43 into a single bidirectional interface.

The processing device 32 may comprise one or more processing units, such as microprocessors, digital signal processors, or combinations thereof.

The storage unit 37 and the memory device 41 may include volatile as well as non-volatile memory regions and storage devices such as hard disk drives, DVD drives, and solid-state storage devices.

In the following, an embodiment shall be described with reference to FIG. 5 and FIG. 6.

Figure 5:
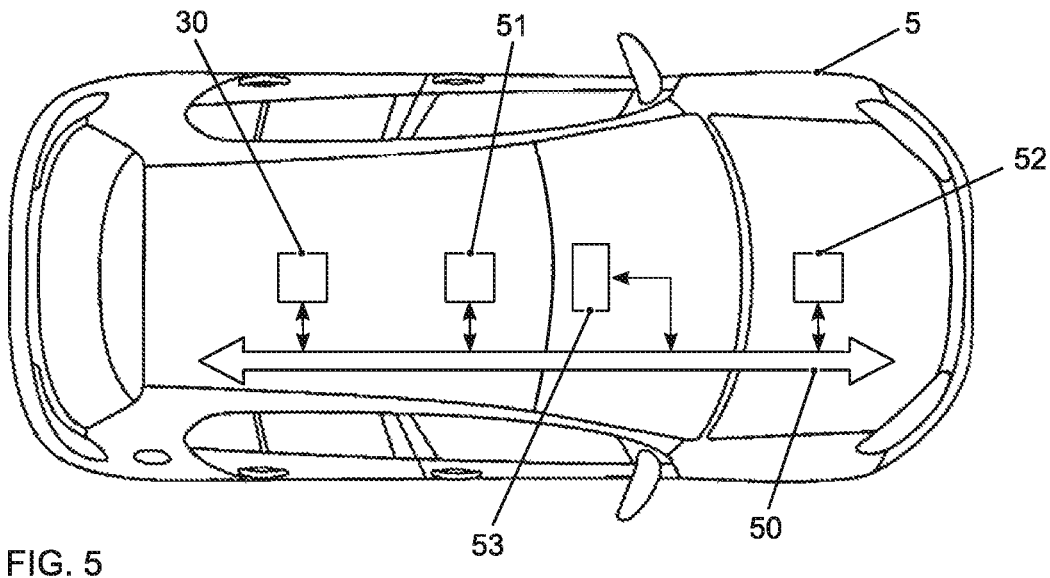
FIG. 5 schematically illustrates a vehicle comprising an apparatus for Vehicle-to-Vehicle communication.

FIG. 5 schematically illustrates a vehicle 5 comprising an apparatus 30 for Vehicle-to-Vehicle communication. The apparatus 30 is connected to an internal network 50 of the vehicle 5. The internal network 50 may, for example, make use of CAN (CAN: Controller Area Network) or Ethernet technology. The exchange of messages between the vehicle 5 and other vehicles is performed by a dedicated communication device 51 of the vehicle 5, which is also connected to the internal network 50. Results of the negotiations with other vehicles are provided to further processing units 53 of the vehicle 5 via the internal network 50, e.g., to provide information to the driver via a display 53 or to automatically perform the necessary driving manoeuvres or actions.

Figure 6:
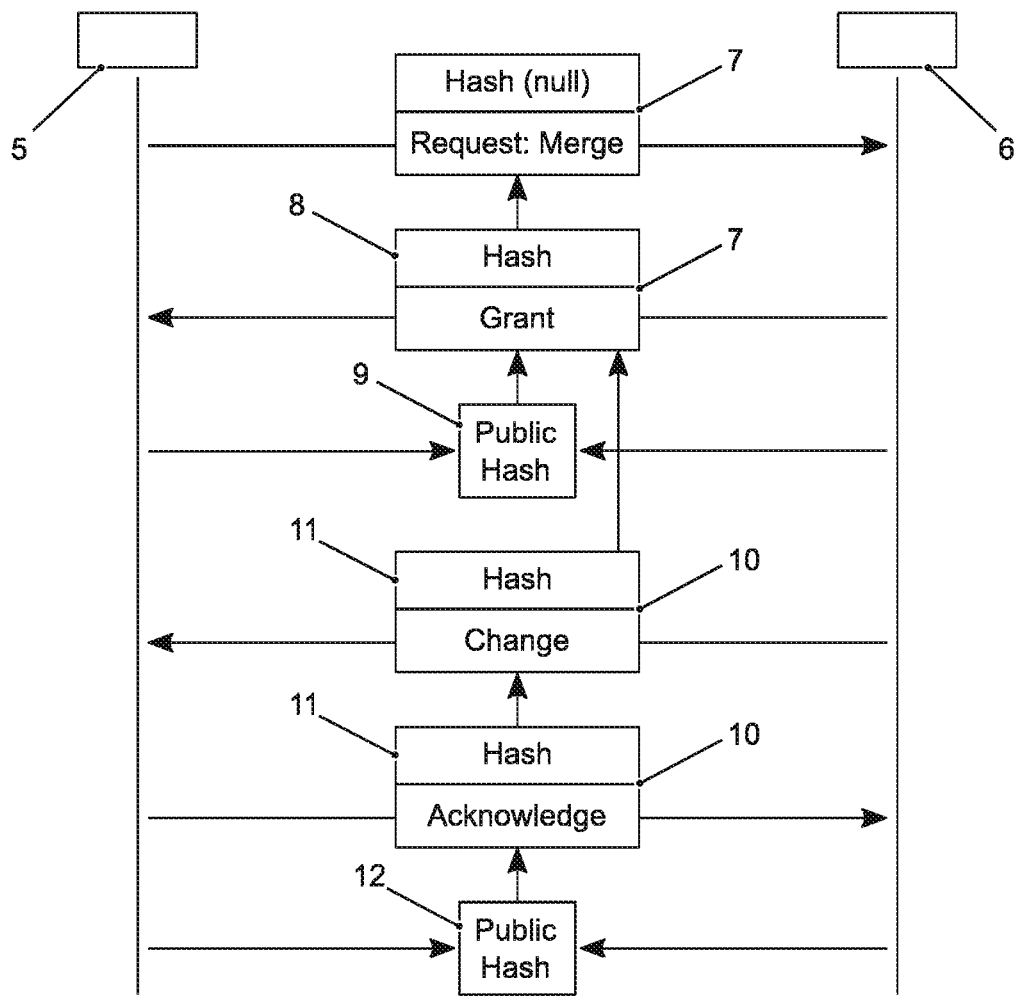
FIG. 6 shows an exemplary exchange of messages between two vehicles.

FIG. 6 shows an exemplary exchange of messages 7, 10 between two vehicles 5, 6. In this example all messages 7, 10 are signed by the vehicles 5, 6. The hash pointers 8, 11 are covered under that signature. The first vehicle 5 sends a message 7 to the second vehicle 6, in this example a request for merging. As this message is the first message in the chain of messages, the hash pointer to the previous message is empty. In response, the second vehicle 6 sends a message 7 to the first vehicle 5, here a grant of the request. This message 7 comprises a hash pointer 8 to the previous message sent by the first vehicle 5. With the grant of the request the negotiation is completed. Therefore, both parties publish the individually signed hash pointer 9 pointing to the most recent message, here stemming from the second message. Both sides can be sure that the other side has heard the same set of messages and act accordingly. If the contract has to be changed, either party can do this by adding another message 10, which has a hash pointer 11 pointing to the last message up to now. The extension of the contract, which might, for example, contain changes, will again be sealed by the publication of the hash pointer 12 to the last message, signed by both parties individually. As this chain of messages is longer than the previous one, it supersedes the previously agreed contract. In FIG. 6, the second vehicle 6 needs to change its plan. It sends a change message 10 with a hash pointer 11 pointing to its grant from the previous operation. This shows that the message is a continuation of an exceeding contract. In response the first vehicle 5 acknowledges the change with a further message. In conclusion of the negotiation both parties publish a hash pointer 12 pointing to the acknowledgment message.

REFERENCE NUMERALS

1 Hash pointer
2, 2', 2" Part of a file
3 Published hash pointer
4, 4', 4" Storage unit
5 First vehicle
6 Second vehicle
7 Message
8 Hash pointer
9 Published hash pointer to last message
10 Further message
11 Hash pointer
12 Published hash pointer to further message
20 Exchange messages between first vehicle and second vehicle
21 Publish hash pointer to last message
22 Add further message to exchange of messages
23 Publish hash pointer to further message
30 Apparatus
31 Interface
32 Communication unit
33 Publication unit
34 Control unit
35 User interface
36 Output
37 Storage unit
40 Apparatus
41 Memory device
42 Processing device
43 Input
44 Output
50 Internal network
51 Communication device
52 Processing unit
53 Display

The invention claimed is:

1. A method for Vehicle-to-Vehicle communication implemented in a first transportation vehicle, the method comprising:

exchanging a plurality of messages between the first transportation vehicle and a second transportation vehicle, each of the plurality of messages being signed using a signature of the respective transportation vehicle, each of the plurality of messages comprising a hash pointer to a respective last previous message, and each hash pointer comprising a link to the respective last previous message and a hash of the respective last previous message, wherein the plurality of messages exchanged between the first and second transportation vehicles pertain to at least one cooperative maneuver for the first and second transportation vehicles in which the first and second transportation vehicles are to perform, after completion of the exchange of the plurality of messages, one or more maneuvers specified in the exchange of the plurality of messages between the first and second transportation vehicles; and publishing, after the completion of the exchange of the plurality of messages, a hash pointer to the last message of the exchange of messages, the hash pointer comprising a link to the last message of the exchange of the plurality of messages and a hash of the last message of the exchange of the plurality of messages, whereby the exchange of the plurality of messages between the first and second transportation vehicles create a contract indicating maneuvers to be performed by the first and second transportation vehicles in a contracted cooperative maneuver, whereby the contracted cooperative maneuver is modifiable based on exchange of further messages between the first and second transportation vehicles, wherein the further messages each comprise a hash pointer comprising a link to the respective last previous message and a hash of the respective last previous message.

2. The method of claim 1, further comprising:
adding each further message to the exchange of messages, the further messages; and
publishing a hash pointer to the further message, the hash pointer comprising a link to the further message and a hash of the further message.

3. The method of claim 1, further comprising storing the messages by the transportation vehicle sending the message.

4. The method of claim 1, further comprising storing the message or the hash pointer of the message by the transportation vehicle receiving the message.

5. The method of claim 1, wherein each message is signed by the transportation vehicle sending the message.

6. The method of claim 1, wherein each published hash pointer is signed by the transportation vehicle publishing the hash pointer.

7. The method of claim 1, wherein the hash pointer to the last message of the exchange of messages is published by both the first and second transportation vehicles.

8. The method of claim 1, wherein the hash pointer to the further message is published by both the first and second transportation vehicles.

9. The method of claim 1, wherein a message is one of a request, grant, change, or acknowledgement of a cooperative maneuver between the first and second transportation vehicles.

10. An apparatus for Vehicle-to-Vehicle communication, the apparatus comprising a processor in communication with a memory storing instructions that when executed by the processor provide:

a communication unit configured to exchange messages between a first transportation vehicle and a second transportation vehicle, each of the messages being signed using a signature of the respective transportation vehicle, each of the plurality of messages comprising a hash pointer to the respective last previous message, and each hash pointer comprising a link to the respective last previous message and a hash of the respective last previous message, wherein the plurality of messages exchanged between the first and second transportation vehicles pertain to at least one cooperative maneuver for the first and second transportation vehicles in which the first and second transportation vehicles are to perform, after completion of the exchange of the plurality of messages, one or more maneuvers specified in the exchange of the plurality of messages between the first and second transportation vehicles; and a publication unit configured to publish a hash pointer to the last message of the exchange of messages after the completion of the exchange of messages, the hash pointer comprising a link to the last message of the exchange of the plurality of messages and a hash of the last message of the exchange of plurality of messages, whereby the exchange of the plurality of messages between the first and second transportation vehicles create a contract indicating maneuvers to be performed by the first and second transportation vehicles in a contracted cooperative maneuver, whereby the contracted cooperative maneuver is modifiable based on exchange of further messages between the first and second transportation vehicles, wherein the further messages each comprise a hash pointer comprising a link to the respective last previous message and a hash of the respective last previous message.

11. The apparatus of claim 10, wherein the communication unit is further configured to add the further message to the exchange of messages, and the publication unit is further configured to publish a hash pointer to the further message, the hash pointer comprising a link to the further message and a hash of the further message.

12. The apparatus of claim 10, wherein the messages are stored by the transportation vehicle sending the message.

13. The apparatus of claim 10, wherein a message or the hash pointer of a message are stored by the transportation vehicle receiving the message.

14. The apparatus of claim 10, wherein each message is signed by the transportation vehicle sending the message.

15. The apparatus of claim 10, wherein each published hash pointer is signed by the transportation vehicle publishing the hash pointer.

16. The apparatus of claim 10, wherein the hash pointer to the last message of the exchange of messages is published by both the first and second transportation vehicles.

17. The apparatus of claim 10, wherein the hash pointer to the further message is published by both the first and second transportation vehicles.

18. The apparatus of claim 10, wherein a message is one of a request, grant, change, or acknowledgement of a cooperative maneuver between the first and second transportation vehicles.

19. A non-transitory computer-readable storage medium having stored therein instructions, which, when executed by a computer, cause the computer to perform a method for Vehicle-to-Vehicle communication implemented in a first transportation vehicle, the method comprising:

exchanging a plurality of messages between the first transportation vehicle and a second transportation vehicle, each of the plurality of messages being signed using a signature of the respective transportation vehicle, each of the plurality of messages comprising a hash pointer to a respective last previous message, and each hash pointer comprising a link to the respective last previous message and a hash of the respective last previous message, wherein the plurality of messages exchanged between the first and second transportation vehicles pertain to at least one cooperative maneuver for the first and second transportation vehicles in which the first and second transportation vehicles are to perform, after completion of the exchange of the plurality of messages, one or more maneuvers specified in the exchange of the plurality of messages between the first and second transportation vehicles; and publishing, after the completion of the exchange of the plurality of messages, a hash pointer to the last message of the exchange of messages, the hash pointer comprising a link to the last message of the exchange of the plurality of messages and a hash of the last message of the exchange of the plurality of messages, whereby the exchange of the plurality of messages between the first and second transportation vehicles create a contract indicating maneuvers to be performed by the first and second transportation vehicles in a contracted cooperative maneuver, whereby the contracted cooperative maneuver is modifiable based on exchange of further messages between the first and second transportation vehicles, wherein the further messages each comprise a hash pointer comprising a link to the respective last previous message and a hash of the respective last previous message.

20. A vehicle comprising an apparatus for Vehicle-to-Vehicle communication, the apparatus comprising a processor in communication with a memory storing instructions that when executed by the processor provide:

a communication unit configured to exchange messages between a first transportation vehicle and a second transportation vehicle, each of the messages being signed using a signature of the respective transportation vehicle, each of the plurality of messages comprising a hash pointer to the respective last previous message, and each hash pointer comprising a link to the respective last previous message and a hash of the respective last previous message, wherein the plurality of messages exchanged between the first and second transportation vehicles pertain to at least one cooperative maneuver for the first and second transportation vehicles in which the first and second transportation vehicles are to perform, after completion of the exchange of the plurality of messages, one or more maneuvers specified in the exchange of the plurality of messages between the first and second transportation vehicles; and a publication unit configured to publish a hash pointer to the last message of the exchange of messages after the completion of the exchange of messages, the hash pointer comprising a link to the last message of the exchange of the plurality of messages and a hash of the last message of the exchange of plurality of messages, whereby the exchange of the plurality of messages between the first and second transportation vehicles create a contract indicating maneuvers to be performed by the first and second transportation vehicles in a contracted cooperative maneuver, whereby the contracted cooperative maneuver is modifiable based on exchange of further messages between the first and second transportation vehicles, wherein the further messages each comprise a hash pointer comprising a link to the respective last previous message and a hash of the respective last previous message.

\* \* \* \* \*